June 21, 1938.  I. COWLES  2,121,624
FLEXIBLE CONDUIT CONNECTION
Filed Sept. 16, 1936
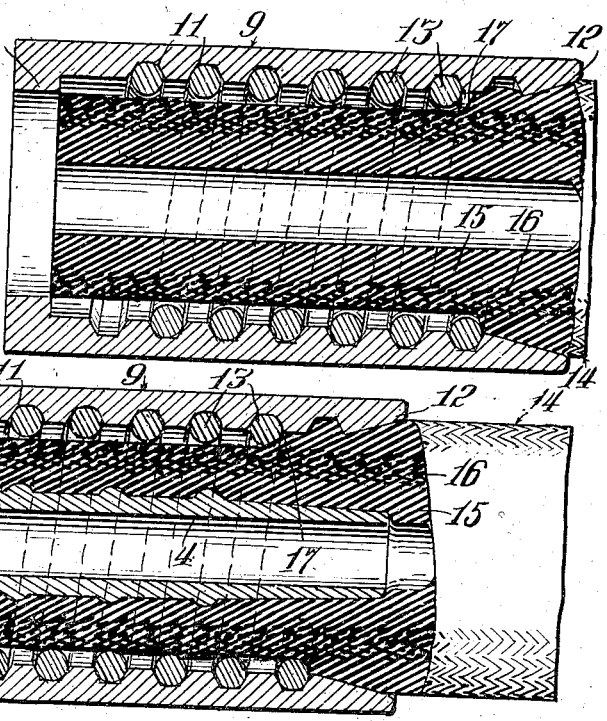
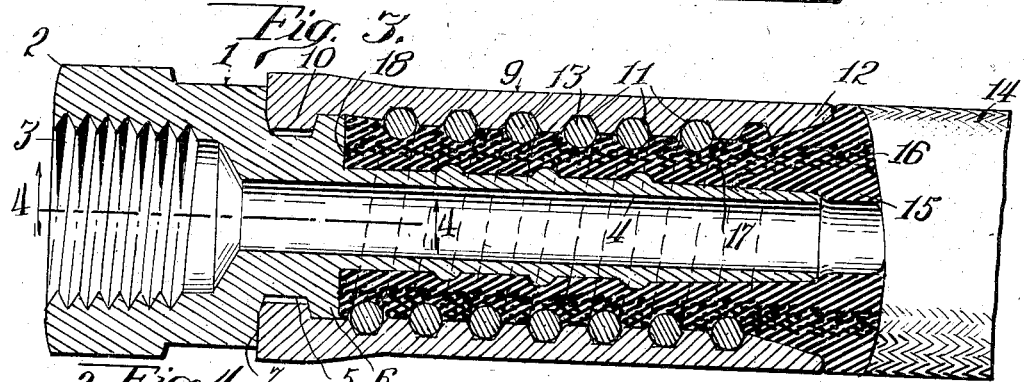
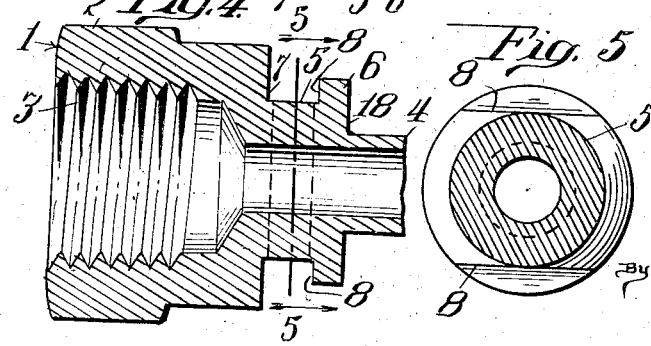
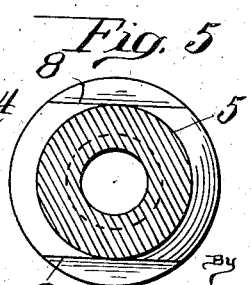
Inventor.
Irving Cowles
By Rudolph M. —
Attorney.

Patented June 21, 1938

2,121,624

UNITED STATES PATENT OFFICE 2,121,624

FLEXIBLE CONDUIT CONNECTION

Irving Cowles, Detroit, Mich., assignor to himself and R. W. Lotz, Chicago, Ill., as co-trustees Application September 16, 1936, Serial No. 101,091

3 Claims. (Cl. 285—84)

The object of the present invention is to provide flexible conduits for high pressure use, composed substantially of three normally and initially dis-assembled members which primarily are disposed in partly assembled relative positions and in primary engagement with an end portion of a hose, and which, thereafter, are forced into final assembled relation for permanently engaging the hose end in fluid-tight relation to the coupling elements to complete a conduit structure possessing certain advantageous characteristics hereinafter particularly pointed out.

The present invention relates also to the method of effecting assembly of a structure of the type above indicated.

The conduit structure and the method of making the same are illustrated in the accompanying drawing, wherein:

Fig. 1 is a fragmentary view comprising a side elevation showing a stem of the body member of a coupling and a central longitudinal sectional view of a coupling shell, a hose end portion, and flexible means within the coupling for engaging the hose end portion, all constructed in accordance with the invention, and showing said respective parts in their relative initial positions prior to effecting assembly thereof.

Fig. 2 is a central longitudinal sectional view showing the respective parts of the ultimate conduit structure disposed in the next succeeding relative positions constituting a further step in the method of this invention.

Fig. 3 illustrates the respective elements as shown in Fig. 2 in final assembled relation to each other.

Fig. 4 is a fragmentary sectional view of the coupling body taken on the line 4—4 of Fig. 3.

Fig. 5 is a transverse sectional view of the coupling body taken on the line 5—5 of Fig. 4.

In carrying out the invention, I provide a coupling body 1, which, in the instance illustrated, is equipped with a hexagonal end portion 2, an internal thread 3, a central stem 4, and an annular groove 5 adjacent one end thereof bordered by an annular flange 6 and an annular shoulder 7.

The side walls of the groove 5 are flared as shown clearly by Figs. 2 and 3, except at two diametrically opposite areas 8, shown in Fig. 5, where said side walls are rendered parallel with each other and with a vertical plane perpendicular to the longitudinal axes of the coupling body.

There is also provided a coupling shell 9 equipped at one end with an inwardly projecting annular flange 10 having side walls extending parallel with a vertical plane extending perpendicularly of the axis of said shell and the inner diameter of which is substantially equal to the outer diameter of the flange 6 and which is adapted to pass telescopically over the latter.

The width of the flange 10 is substantially equal to, but no larger than that of the mouth of the annular groove 5.

The said shell 9 is also equipped with a thread formation 11 which extends substantially from the mouth end portion 12 of said shell to a point contiguous to but spaced from the flange 10. The said thread formation 11 is of relatively steep pitch so that it is adapted to receive and engage a wire helix 13, as shown. The helix 13 is of less length than the said thread formation 11 of the coupling shell.

The coupling of the present invention is particularly designed and adapted for engagement with the type of flexible conduit or hose, the wall of which is equipped with one or more annular reinforcing sleeves composed generally of braided wire. In the instance illustrated, the inner hose or conduit 14 is equipped between the inner tube 15, of rubber, and its outer jacket or wall portion, with a plurality of said reinforcing sleeves 16, as shown in Figs. 1, 2 and 3.

The outer jacket of the hose end 14 is cut annularly radially down to the outermost of said reinforcing sleeve 16 thereof at a point spaced appreciably from an extremity of the hose end, the portion of said jacket between said annular incision and the extremity of said hose being peeled off so as to expose the outermost of said reinforcing sleeves 16, and also to provide an annular shoulder 17 at one end of the said exposed portion.

The operation of removing this portion of the jacket of the hose is commonly termed "skiving" and, therefore, the said end portion will be referred to herein as the skived end portion of the hose end.

The said shoulder 17 is spaced from the extremity of the hose a distance appreciably less than the length of the coupling shell 9 and said skived end portion is of appreciably smaller diameter than the inner diameter of said coupling shell 9.

The gauge of the wire of which the helix 13 is composed is such that said helix, when engaged in the thread formation 11 of the shell 9, will project inwardly from the inner surface of said shell 9 sufficiently to practically snugly fit the skived end portion of said hose end.

In effecting assembly of the several aforesaid elements, the helix 13 is first mounted upon the skived end portion of the hose with one end of the helix disposed in contact with the said annular shoulder 17. Said helix is appreciably shorter than said skived end portion.

After said helix has been disposed upon the skived end portion of the hose, it is threaded into engagement with the threads of the shell 9 simultaneously with the insertion of the hose end into said shell until the hose end and helix shall attain substantially the position shown in Fig. 1.

After this has been accomplished, the stem 4 of the coupling body 1 is forced into the inner tube of the hose end as shown in Fig. 2, thereby expanding said hose end appreciably and thus also effecting an appreciable shortening of the latter.

This shortening permits the flange 6 to attain the position within the shell shown in Fig. 2 and causes the extremity of the hose to abut the annular shoulder 18 at the inner end of the stem 4.

The coupling shell 9, while disposed in the position shown in Fig. 2, is contacted progressively from its mouth 12 over its entire length to decrease its diameter to the extent necessary to cause the cylindrical face of the flange 6 to engage the inner cylindrical face of the shell 9 and force the flange 10 of the shell 1 into the groove 5 of the coupling body.

This contraction is effected by forcing the shell through the flared opening of a suitable die, such as is illustrated and described in Letters Patent No. 1,752,976, the opening whereof is of the maximum diameter equal to the desired reduced outer diameter of the shell. The force employed is sufficient to cause the said flange 10 to be distorted to fit snugly the flared portion of the annular groove 5, while said flange 10 will normally engage the flat surface portions 8 of the groove 5 shown in Fig. 5, the latter cooperating with said portions of the flange 10 engaged therein to prevent all relative rotation between the coupling body and the shell 9, said shell being also obviously held against longitudinal movement relatively to the coupling body.

The contraction of the shell throughout its length to the last-mentioned diameter effects a progressive contraction of the helix 13 from its outer end portion, where it abuts the shoulder 17 of the hose end, and such contraction causes a progressive elongation of said helix so that as the latter becomes partially embedded in the reinforcing sleeves 16 of the hose end, it also engages a greater length of the latter and of the thread formations 11 of the shell 9.

Following the initial contraction of the shell 9 as above described, the same is preferably still further contracted progressively from its mouth to its inner end portion, as shown in Fig. 3, thereby effecting a still further contraction and elongation progressively of the helix 13 which is then positioned as shown in Fig. 3.

The mouth portion of the shell 5 is flared as illustrated in Figs. 1, 2, and 3 and, preferably, the thread formation 11 is cut through the flared portion wherein it vanishes.

As much of the thread formation as lies within the flared portion of the mouth of the shell serves merely to engage the rubber outer jacket of the hose, but is ineffective to prevent withdrawal of the hose end from the coupling.

It will be obvious from the foregoing description that variations in diameter of the reinforcing sleeves of the hose will be easily compensated for by employment of helices 13 composed of wire of a gauge adapted to compensate for the same.

The advantages incident to the present structure are first, avoidance of distortion of the helix, and second, the accomplishment of its gradual partial embedding into the reinforcing sleeves 16 of the skived end portion of the hose while at the same time the inner tube 15 of the hose is compressed gradually and always toward its inner extremity. This causes the soft material of which the inner tube is composed, together with such soft displaceable material as may lie between the several sleeves 16, to build up a very compact seal against the shoulder 18 of the body member, it being obvious further, that the cross sectional shape of the wire of the helix 13 is such as to preclude cutting through the reinforcing sleeve 16. The distortion of the latter effected by partial embedding of the helix 13 into the same prevents all possibility of the hose end being forced or pulled out of the coupling shell after permanent assembly has been effected as hereinbefore described.

I claim as my invention:

1. A hose coupling comprising a body member, a cylindrical contractible shell equipped with an internal thread formation, a helical wire member of less length than that of said thread formation disposed within said shell and in engagement with said thread formation throughout substantially all except the innermost end portion of the latter and adapted to embrace a hose end projecting into said shell to greater depth than said wire member to be permanently engaged with said coupling, the said shell adapted to be contracted progressively from its mouth to its inner end portion thereby to progressively contract said wire member into firm engagement with the hose end and progressively elongate said wire member from its outer to its inner extremities during said progressive contraction of the hose and cause the latter to engage a correspondingly greater length of said hose end portion lying within said shell.

2. A hose coupling comprising a body member equipped with a central stem for engagement within a hose end and a contractible shell for receiving the hose end, said shell equipped internally with a thread formation extending substantially from its mouth to its innermost end portion, a wire helix of less length than said thread formation snugly engaged within the same from the front end portion thereof to a point adjacent its rear end and adapted to embrace said hose end, whereby upon contracting said shell progressively from its mouth to its rear end portion, said helix will be contracted and elongated progressively to engage in the outer surface of the hose end throughout a length greater than the initial length of said helix, distortion of the latter during contraction of the shell being prevented by its elongation.

3. A hose coupling including a body portion equipped adjacent one end portion thereof with an annular external groove, a contractible coupling shell equipped at one end with an inwardly projecting annular flange engaged in said groove by initial contraction of said shell over its entire length, said shell equipped internally with a thread formation extending from its mouth portion to a point adjacent the coupling body, a wire helix of less length than said thread formation and of a diameter initially to fit said thread formation prior to said contraction of said shell and initially contracted and elongated by contraction of said shell, a hose end portion of an outer diameter substantially equal to the initial inner diameter of said helix disposed within the latter and said shell prior to said contraction of the latter whereby the wire helix is caused to become partially embedded in said hose end upon said contraction of said shell, the latter being further contracted from its mouth portion to its inner end portion following said initial contraction thereof thereby effecting additional contraction and elongation of said wire helix.

IRVING COWLES.